US005491553A

United States Patent [19]

Gebhart

[11] Patent Number: 5,491,553

[45] Date of Patent: Feb. 13, 1996

[54] TRIPLE LASER ROTARY KILN ALIGNMENT SYSTEM

[75] Inventor: Walter M. Gebhart, Scarborough, Canada

[73] Assignee: Phillips Kiln Service Company of Canada, Ltd., Scarborough, Canada

[21] Appl. No.: 252,021

[22] Filed: Jun. 1, 1994

[51] Int. Cl.[6] .......... G01B 11/00

[52] U.S. Cl. .......... 356/375; 356/400

[58] Field of Search .......... 356/153, 375, 356/400; 250/561, 559.29

[56] References Cited

U.S. PATENT DOCUMENTS

| | | | |
|---|---|---|---|
| 3,517,915 | 6/1970 | Bovagne et al. | 263/33 |
| 3,653,774 | 4/1972 | LaRoche | 250/203.3 |
| 3,724,887 | 4/1973 | Roberts | 287/189.36 |
| 3,852,579 | 12/1974 | Sohn et al. | 356/387 |
| 3,902,810 | 9/1975 | Hamar | 356/138 |
| 3,922,094 | 11/1975 | Colding et al. | 250/560 |
| 4,049,644 | 9/1977 | Wennerstrom | 250/233 |
| 4,056,349 | 11/1977 | Parisis et al. | 432/32 |
| 4,060,329 | 11/1977 | Ellis | 356/167 |
| 4,137,039 | 1/1979 | Stolzenberg | 432/103 |
| 4,193,756 | 3/1980 | Leon | 432/3 |
| 4,227,802 | 10/1980 | Scholdstrom et al. | 356/5 |
| 4,295,824 | 10/1981 | Wens | 432/115 |
| 4,427,044 | 1/1984 | Plough et al. | 356/386 |
| 4,533,319 | 8/1985 | Mathews et al. | 432/32 |
| 4,555,633 | 11/1985 | Bjorkelund | 250/560 |
| 4,698,491 | 10/1987 | Lysen | 250/201 |
| 4,708,482 | 11/1987 | Neiheisel | 356/376 |
| 4,725,738 | 2/1988 | Lysen | 250/561 |
| 4,737,031 | 4/1988 | Mahlberg et al. | 356/372 |
| 4,771,182 | 9/1988 | Fulkerson | 250/561 |
| 4,907,879 | 3/1990 | Webb | 356/400 |
| 4,991,965 | 2/1991 | Busch | 356/375 |
| 5,146,795 | 9/1992 | Gebhart | 356/375 |
| 5,148,238 | 9/1992 | Gebhart | 356/375 |

FOREIGN PATENT DOCUMENTS

| | | | |
|---|---|---|---|
| 0113552 | 7/1984 | European Pat. Off. . | |
| 2221988 | 10/1974 | France | 432/103 |
| 157103 | 9/1982 | Japan | 356/375 |
| 307308 | 12/1988 | Japan | 356/375 |

*Primary Examiner*—F. L. Evans

*Attorney, Agent, or Firm*—Caesar, Rivise, Bernstein, Cohen & Pokotilow, Ltd.

[57] ABSTRACT

The locating of the local centre of rotation of a cylindrical body from outside the body, while the body is rotating upon supporting bearings is carried out using a number of distance-measuring diode lasers mounted upon a movable chassis. Such determination of local centres of rotation can be used in the case of hot kilns to re-align the supporting sets of bearings upon which the kiln is rotatably supported. The integrated triangulation monitoring chassis is located in sequence at respective axial stations located along the kiln, adjacent the supporting bearings, and at each station a simultaneous single set of readings from three diode lasers to the shell surface enables a computer to calculate the location of the centre of rotation relative to the chassis. The location of the chassis, relative to a selected datum, is determined by the use of an integrated total station theodolite, which is repositioned, as required, to enable it to access and locate the chassis. A pair of prism reflectors mounted to the chassis facilitate the action of the theodolite, remote radio control being used to align the respective prisms towards the theodolite, in reflecting relation therewith. With each relocation of the theodolite datum its location relative to the original datum is determined, so that the derived centre distances, as measured by the diode lasers, can be plotted in true relation with a common datum, enabling ready determination of the corrections to the supporting bearings that are necessary, in order to achieve a unified axis of rotation for the kiln.

20 Claims, 7 Drawing Sheets

TRIPLE LASER ROTARY KILN ALIGNMENT SYSTEM

TECHNICAL FIELD

This invention is directed to a surveying system including a process, and apparatus for carrying out the process. In particular the process is directed to determining the precise location of an integrated monitoring apparatus, and for locating the rotational axes of a long kiln.

BACKGROUND OF THE INVENTION

The successful operation of certain rotating machines such as hot kilns has, in the past, proved difficult to sustain. Due to wear and tear of the supporting bearings and tires, and distortion of various parts of the system, including possible movement of the supporting piers upon which the kilns are mounted, the bearing rollers can get out of alignment, so as to cause portions of the kiln to rotate about different rotational axes. These motions then produce cyclic distortions of the kiln shell. Such cyclic distortions adversely affect the meshing of the driving gears and can become disruptive of production and destructive of the kiln lining and the shell.

In my earlier U.S. Pat. No. 5,148,238, issued Sep. 15, 1992, I disclosed the use of a diode laser instrument for making accurate measurements to the surface of the kiln shell, in determining the location of its centre of rotation at that position. The laser measurements for each axial station along the length of the shell were made at three cardinal locations about the shell, in a plane normal to the kiln main axis, and the points of measurement indexed back at the instant of measurement to a pair of datum axes running alongside the length of the kiln, close to ground level. In the working environment of an operating kiln the extended time necessary to effect the necessary operations, including instrument relocations, at the three o'clock, six o'clock and nine o'clock positions, and the difficulty of locating the instrument at those locations all combine to make the operation tedious and time consuming.

SUMMARY OF THE INVENTION

The present invention provides apparatus for determining the location of a body relative to an established datum, comprising survey theodolite means for reading upon a distant object, the object having at least one reflecting target, and target adjustment means for aligning the target in substantially aligned reflecting relation with the theodolite means to enable line of sight measurement thereby in accurately determining the location of the object in three dimensions, relative to the aforesaid datum.

In a preferred embodiment two reflecting targets, comprising prisms, are mounted upon the object, a monitor chassis.

The target adjustment means may comprise remote control means for orienting each prism to "look" at the theodolite in reflecting relation therewith, to facilitate the measuring by the theodolite of the precise location of each prism, and hence, of the chassis.

The remote control means may comprise a radio activated control for each prism, each control having a pair of servo motors in position controlling relation with its prism, which is mounted in gimbals, for universal adjustability.

Prisms are selected as the reflecting target due to an inherent tolerance provided by their geometry to slight inaccuracies of alignment, a tolerance not present in a plain mirror.

The two prisms are each located on the chassis in predetermined spatial relation with a respective diode laser, and the measurement datum for each laser is readily correlated to the focal centre of the respective prism. This serves to directly correlate back to the respective prism the distance readings from the diode laser to its target.

The datum defined by the prisms may in turn be related back to the base datum of the survey theodolite.

In each case when the chassis is moved to another station at a different axial location along the length of the kiln, the survey theodolite may be suitably relocated to another ranging position from which at least one, and preferably two of such stations may be ranged upon.

By precisely ranging the survey theodolite from its initial (zero) ranging datum location to the succeeding datum locations, the respective locations of the chassis may be precisely back-related, by way of universal three-axis ordinates, to the original base datum. This yields x, y and z axis corrective values.

These back-relating adjustments may be similarly applied to the readings from the diode lasers, so as to correlate all measurements from off a target back to the zero base datum, by way of three dimensional x, y and z coordinates.

In mounting two diode lasers upon the chassis, distance ranging to a planar object may be readily achieved.

The provision of three such diode lasers, reading in a common plane upon an arcuate surface enables ready calculation of the location of the centre of curvature of the surface to be made.

In the case of a shell that is not precisely round, which is usually the case, and which exhibits a certain extent of planetary motion in rotating upon its bearings, the centre that is determined is more precisely the centre of rotation of the shell.

In accordance with my present invention, the chassis carrying the three diode lasers is aligned with a visible peripheral line scribed about the surface of a kiln shell by rotation of the kiln past a fixed point such as a marking chalk, to define a plane substantially normal to the polar axis of the kiln.

The three aligned, mutually spaced diode lasers are mounted upon the chassis with the two outer lasers inclined inwards towards the centre laser by about 22 degrees from parallelism.

In operation I have found, using this chassis arrangement with the three diode lasers mounted in comparatively close mutual proximity that the considerable flattening effect upon the shell due to self-weight, which produces a distorted ovoid shape, has little effect upon the accuracy of my measuring system, unlike my former system, referred to above.

The capability to obtain the required triad of readings from a single positioning of the chassis at a respective station reduces the required diode laser location time by about 50%. Also, the capability to relocate the theodolite datums wherever convenient for observing the chassis, without being required to establish and continually refer back to fixed datum axes, one on each side of the kiln as formerly was necessary, greatly reduces the set-up time, and increases the flexibility of the system for coping with the facility-crowded conditions that may readily prevail about the piers of an operational kiln.

The survey theodolite functions are very well handled by an Integrated Total Station theodolite. I have found the TOPCON "ITS 1" instrument with its Field Data Management Program and PCMCIA removable magnetic digital data recording card suitable for this purpose.

This laser equipped instrument with its digital electronic recording capability, and removable PCMCIA recording card, simplifies transferring the datum location corrective data to a computer to which the outputs from the diode lasers are fed.

The calculation for the location of each instantaneous centre of rotation of the kiln shell is given below.

In operation the subject system may typically be used on an inclined kiln having as many as eight support tires spaced along its length, and extending for up to 600 feet in total length.

Such kilns can range from 8 feet to 22 feet in diameter, and greater. Usually, each tire is supported upon three bearing rollers, carried upon a high pier that may be subject to sway, when in operation.

Loads acting upon each set of rollers can range from 300 tons to as much as about 1500 tons.

The diode laser stations are generally located respectively on each side of each supporting tire, so as to establish the rotational centre for the kiln shell at that bearing.

The triad of diode laser readings are taken from the surface of the shell, closely adjacent and on both sides of the tire, so as to provide a fair indication of the effective shell centre in the plane of the bearing.

The triad of diode laser readings are transferred to a computer that is programmed to reduce the "triad" of readings to the x and y coordinates of the shell rotational centre, at that station, relative to the chassis.

The datum location corrective data, input by disc from the ITS, and applied by the computer to the respective rotational coordinates then yields x, y and z coordinates for the shell rotational axis at each station, to a common base. This can then be plotted or graphed to give the centreline characteristic for the kiln.

A preferred optimum straight line for the kiln polar axis may then be selected, based upon a number of considerations, including driving gear alignment, required kiln slope, minimized bearing adjustment to achieve the desired line, etc., and the necessary corrective program for adjusting the required bearings can be instituted.

The preferred embodiment of the subject chassis may incorporate a blower for the supply of cooling air to the diode lasers, and to the radio receiver by means of which the prism servos are controlled, if so required.

The chassis may be of a size to sit upon a tripod at about chest height, if desired, for ease of handling and accessability.

BRIEF DESCRIPTION OF THE DRAWINGS

Certain embodiments of the invention are described by way of example, without limitation of the invention thereby, other than by way of the appended claims, being illustrated in the accompanying drawings, wherein:

DETAILED DESCRIPTION OF THE INVENTION

Figure 1:
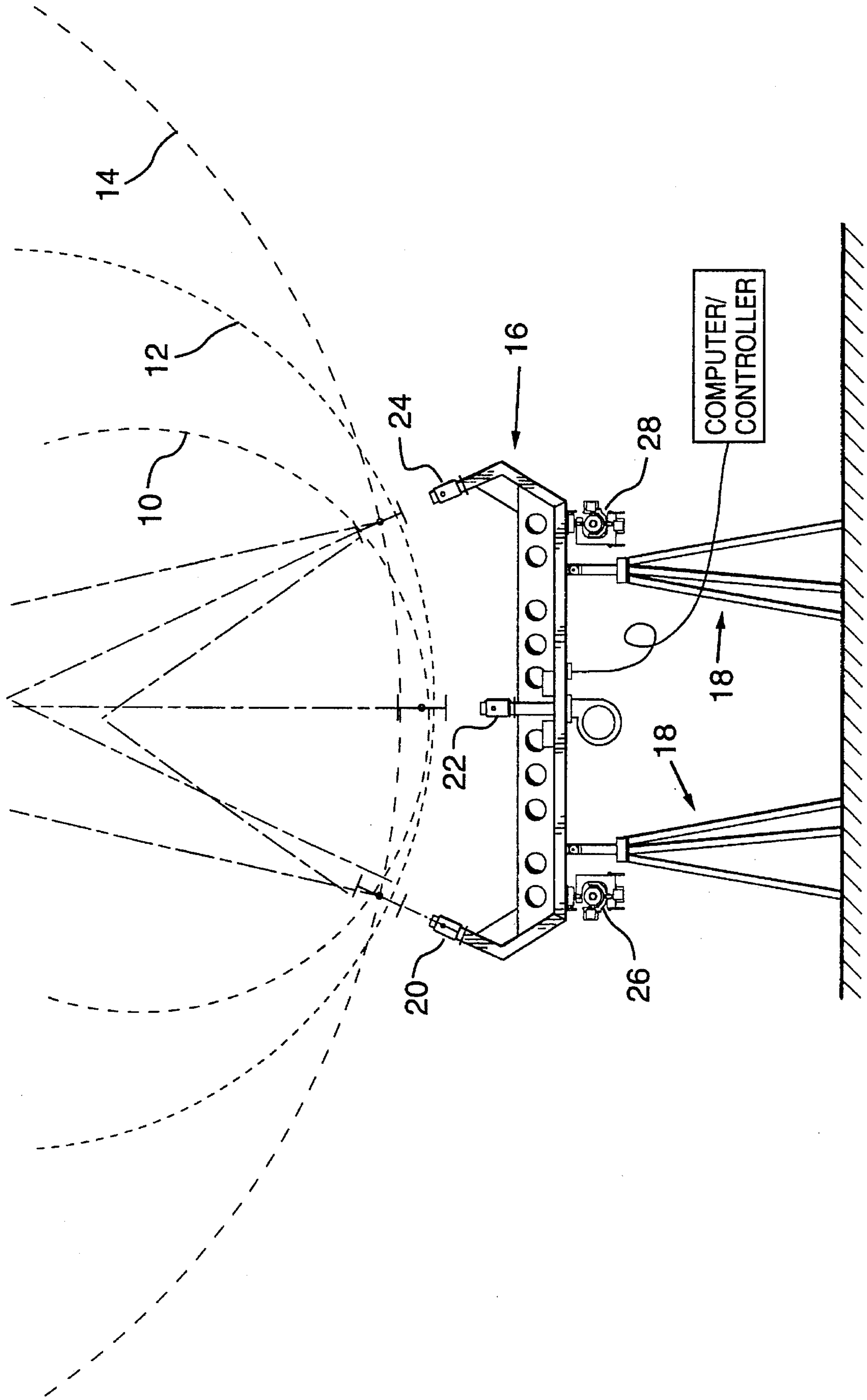
FIG. 1 is a schematic end elevation showing the subject chassis and diode laser instruments according to the present invention, in relation to a range of sizes of shells.

Referring to FIG. 1, peripheral surface portions of three kiln shells, 10, 12 and 14 are shown in phantom, the supporting rolls therefor being omitted for purposes of clarity.

A monitor chassis 16 according to the invention is shown, mounted below the shells upon a pair of tripods 18, 18.

Three diode lasers 20, 22 and 24 are mounted upon the chassis 18, and two prisms 26 and 28 are located therebeneath.

A radio receiver 27 has an antenna 29 therefor extending downwardly from the chassis 16.

Figure 2:
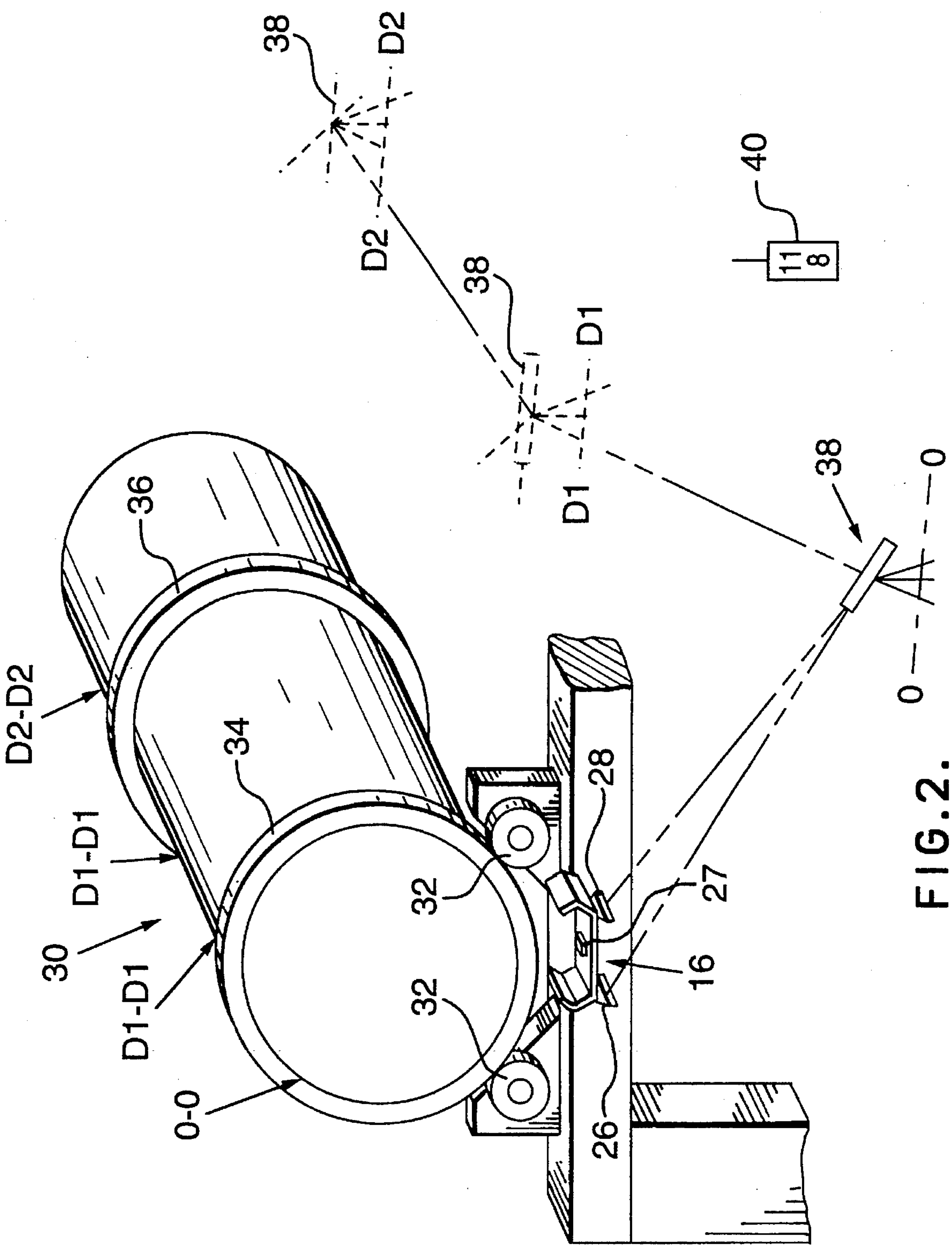
FIG. 2 is a schematic perspective elevation of a portion of a kiln, in relation to three datum locations for the theodolite.

Referring to FIG. 2, a kiln shell portion 30 is shown in relation to two of its supporting rolls 32.

Tires 34, 36 extend in supporting relation about the shell 30, the tire 34 being carried upon the rolls 32.

The monitor chassis 16 is illustrated as being located at the six o'clock position beneath the shell 30.

A survey theodolite 38 is shown at its first 0—0 Base Datum, and at succeeding datums D1—D1, and D2—D2.

From the Base Datum the theodolite 38 can "see" the two prisms 26 and 28, in the position illustrated, at the downstream near side of the tire 34.

A radio transmitter 40 provides controlling communication with the receiver 27.

From the succeeding datum D1—D1 the theodolite 38 can see the prisms 26, 28 when they are located on the far side of tire 34, and also when the chassis 16 and prisms 26, 28 are located on the near side and adjacent tire 36.

With the chassis 16 transferred to the far side of tire 36, the theodolite is transferred to Datum D2—D2, to view that station and the succeeding station.

Figure 3:
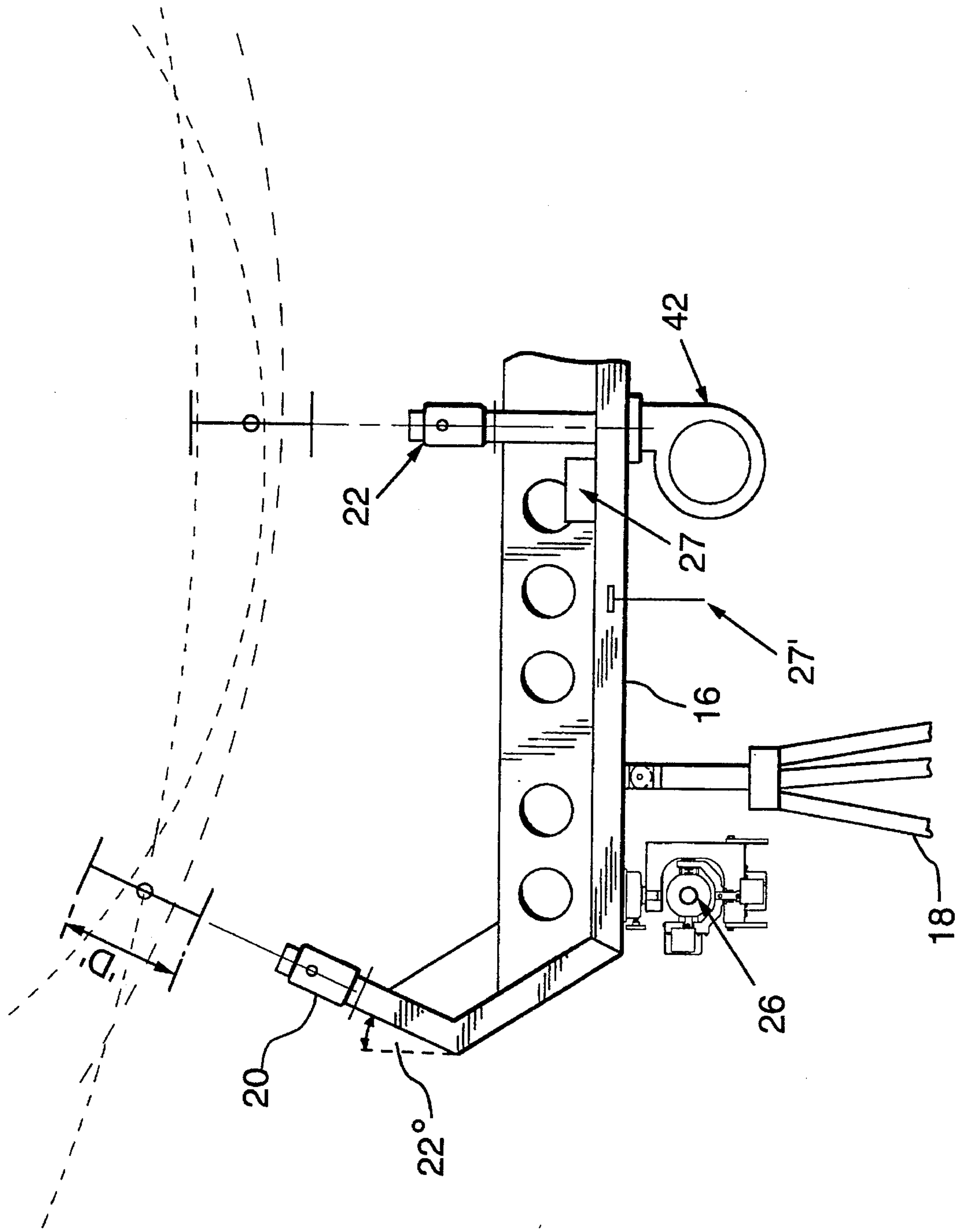
FIG. 3 is an enlarged view of a portion of the chassis and its components.

Referring to FIG. 3, the chassis 16 is shown in part, having an air blower 42 delivering air to the hollow interior of the chassis 16, for distribution therethrough to the three diode lasers 20, 22, 24, and to other apparatus thereof as necessary, in the hot environment of the kiln.

The laser 20 is illustrated as being inclined inwardly by about 22 degrees from an axis parallel with the central laser 22.

The dimension "D" shown is an indication of the measuring range provided by the diode laser, so as to encompass the local differences due to shells in a range from 8 feet to 22 feet diameter. In use the height of the tripod 18 is adjustable, to locate the diode lasers 20, 22, 24 in suitable operating relation with the outer surface of the shell upon which the lasers read, so as to keep the shell surface within the measuring range of the instrument.

Figure 4:
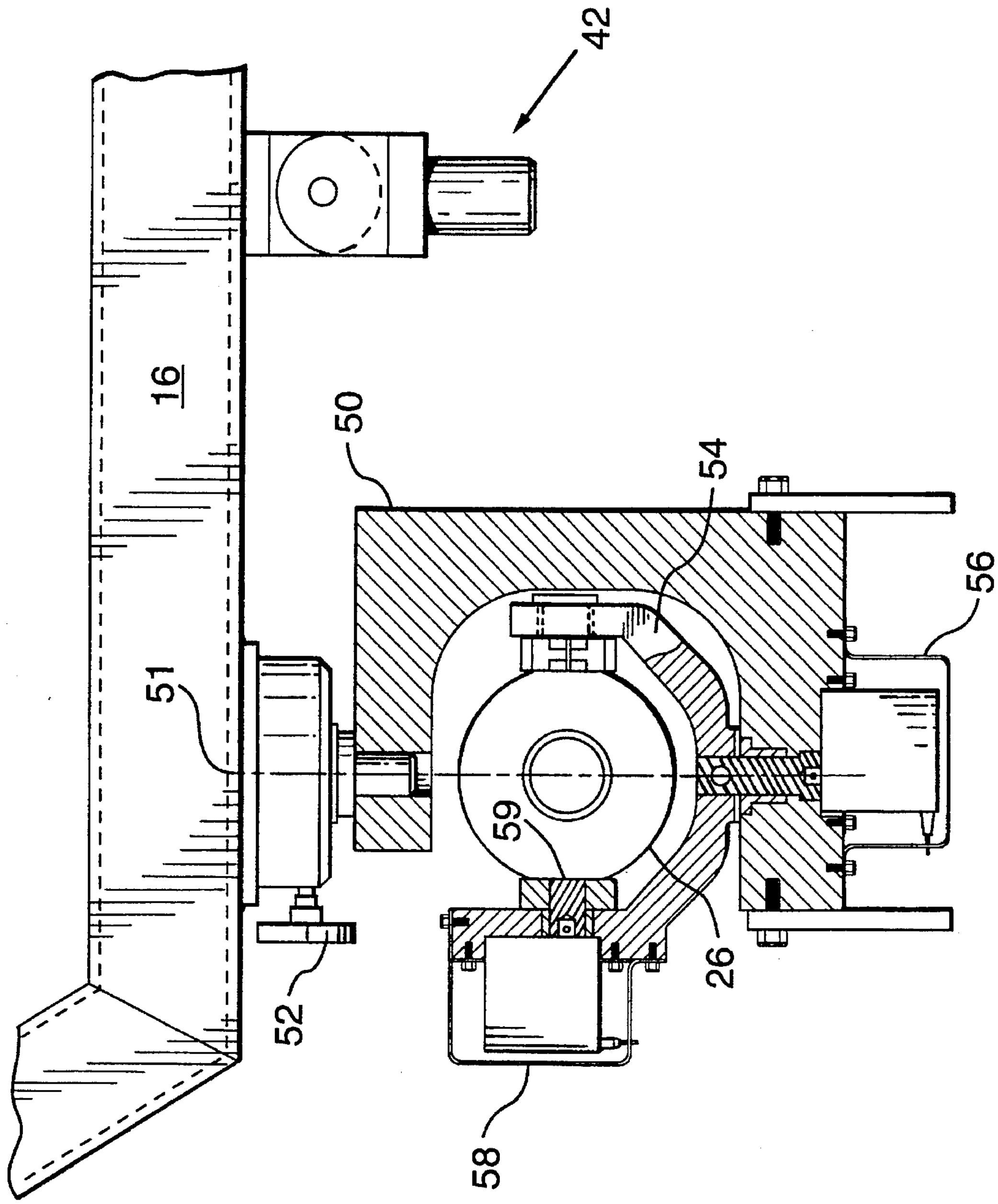
FIG. 4 is an enlarged view of one of the prism mounting arrangements.

Referring to FIG. 4, the illustrated prism 26 is suspended by frame 50 beneath the chassis 16. The U-shaped frame 50 is manually adjustable about a vertical pivotal axis 51, having a locking screw 52 in securing relation therewith. A gimbal frame 54 is pivoted about vertical axis 51, by means of first gimbal motor 56.

A second gimbal motor 58 connected with the prism 26 is horizontally pivoted at 59.

A radio receiver 27 (aerial 27') is connected in controlling relation with the gimbal motors 58 and 58, to orientate the prism 26 to "look" at the survey theodolite 38. In use, this enables the survey theodolite 38 to range upon the respective prisms 26, 28 in precise locating relation therewith.

Figure 5:
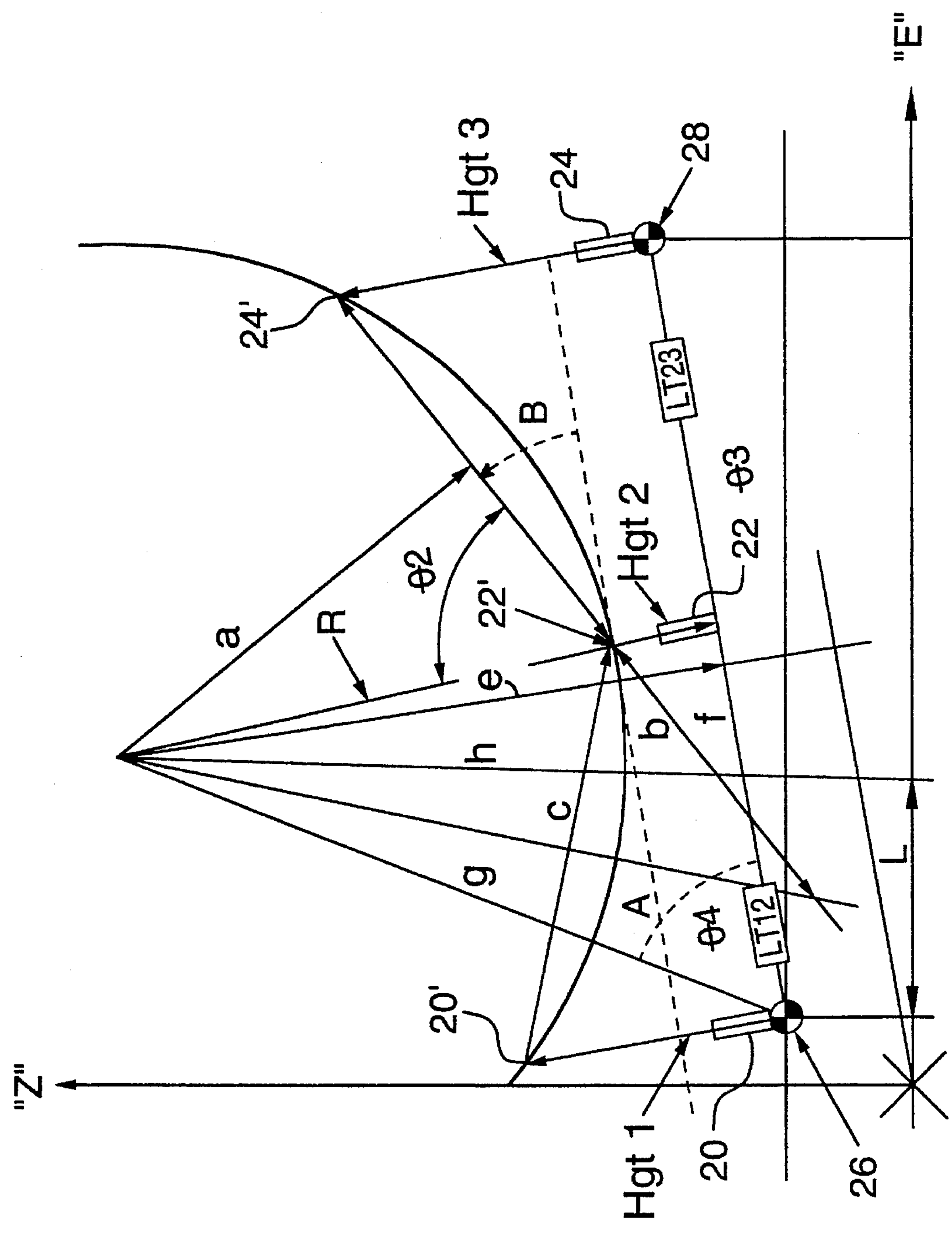
FIG. 5 is a schematic showing of the diode laser positions and readings in relation to the determination of the shell centre.

Referring to FIG. 5, the three dimensional coordinate system has a vertical coordinate Z, longitudinal coordinate N and lateral coordinate E, and is schematically illustrated as having the prisms 26, 28 located in coincidence with diode lasers 20, 24 respectively.

For the initial location of the survey theodolite 38 at Datum 0—0 the values of Z, N and E are all zero.

The readings of diode lasers 20, 22, 24 are, respectively: Hgt1; Hgt2 and Hgt3, being read at points 20'; 22' and 24'.

The respective geometric values a, b, c, d, e, f, g, h and i; and the angles A and B, 02, 03 and 04 are calculated using chassis constants 1, 2, 3, and LT12, LT23, to give the following relationships: (where * indicates a value is squared, and where ** indicates the power ½ i.e. a square-root)

$$
\begin{aligned}
d &= (½)[(Hgt3 - Hgt2)^* + LT23^*]^{**}\\
c &= (½)[(Hgt1 - Hgt2)^* + LT12^*]^{**}\\
b &= c / \cos(A + B)\\
a &= (b+d)\ \mathrm{Tan}\ (90 - A - B)\\
\text{Shell radius } R &= [a^* + d^*]^{**}\\
02 &= A\ \mathrm{Tan}(a/d)\\
e &= R \cdot \mathrm{Sin}(B + 02) + Hgt3\\
f &= LT12 + R \cdot \mathrm{Cos}\ (B + 02)\\
g &= [e^* + f^*]^{**}\\
04 &= A \cdot \mathrm{Tan}(e/f)\\
h &= g \cdot \mathrm{Sin}(03 + 04)\\
i &= g \cdot \cos(03 + 04)
\end{aligned}
\quad \Big\}\ \text{for station 0-0 i.e. in plane N=0}
$$

Position of Kiln Centre is given by
N . . . Prsm1
E . . . Prsm1 + i
Z . . . Prsm1 + h Where Prsm 1 is the three location coordinates of prism 26, as registered by the survey theodolite 38 from Datum 0—0.

The FIG. 5 illustration is for the centre distance when measured in a plane normal to the kiln main axis. Similar calculations will locate the kiln centre when the kiln axis is not parallel to any of the reference planes.

In the case of the FIG. 1 embodiment, where the diode lasers 20, 24 are off-set from the prisms 26, 28, the datum values for the chassis can be readily correlated, as constants for the individual chassis, to correct for the offset.

Figure 6:
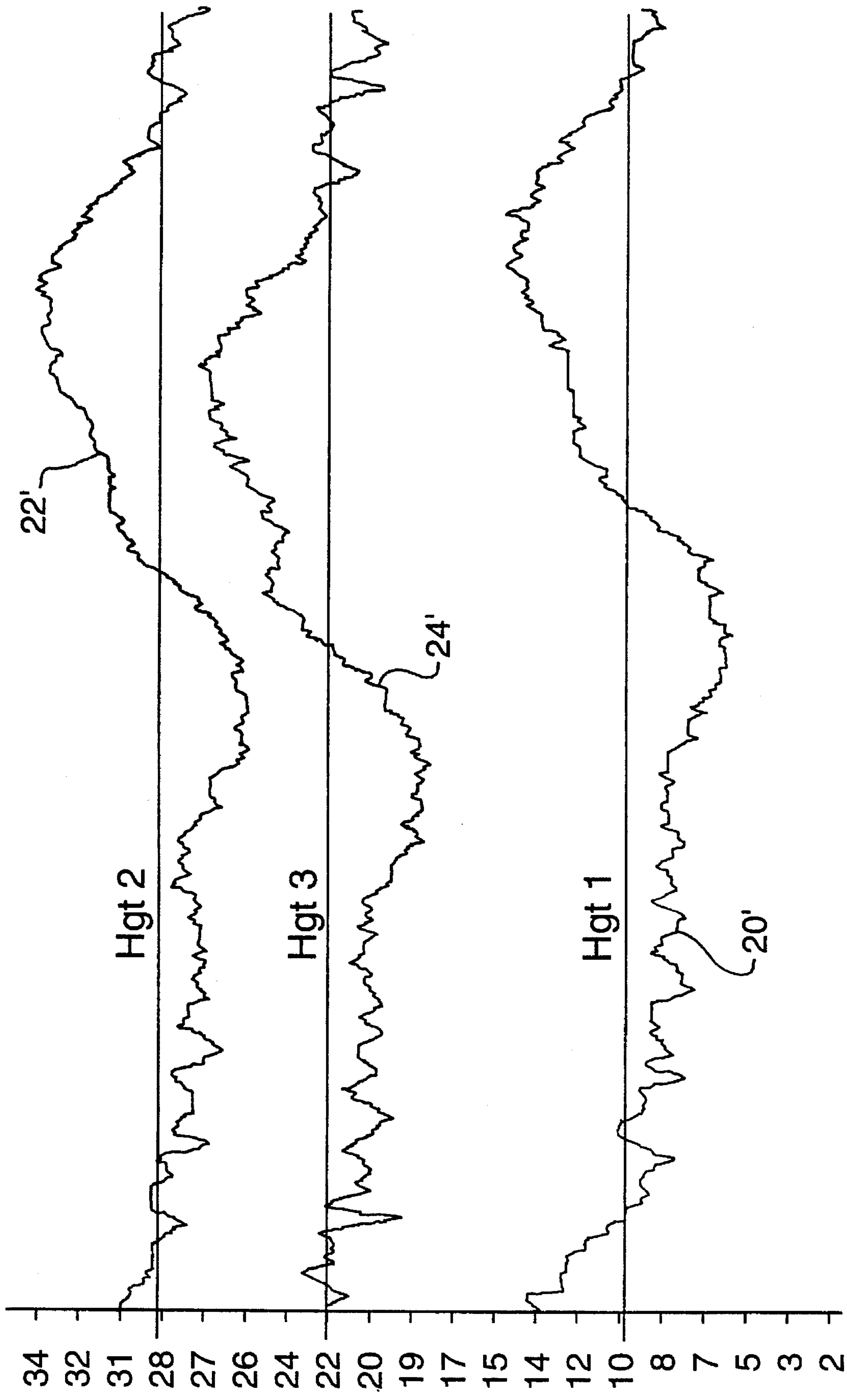
FIG. 6 is a set of actual readings from the three lasers for a first station.

Referring to FIG. 6, the instantaneous readings of distance values to the rotating shell are plotted for at least one full rotation, giving characteristic curves 20'; 22'; 24'. The mean values actually obtained were:

Laser 1 . . . 9.9 mm; Laser 2 . . . 29.1 mm; Laser 3 . . . 22.0 min.

Figure 7:
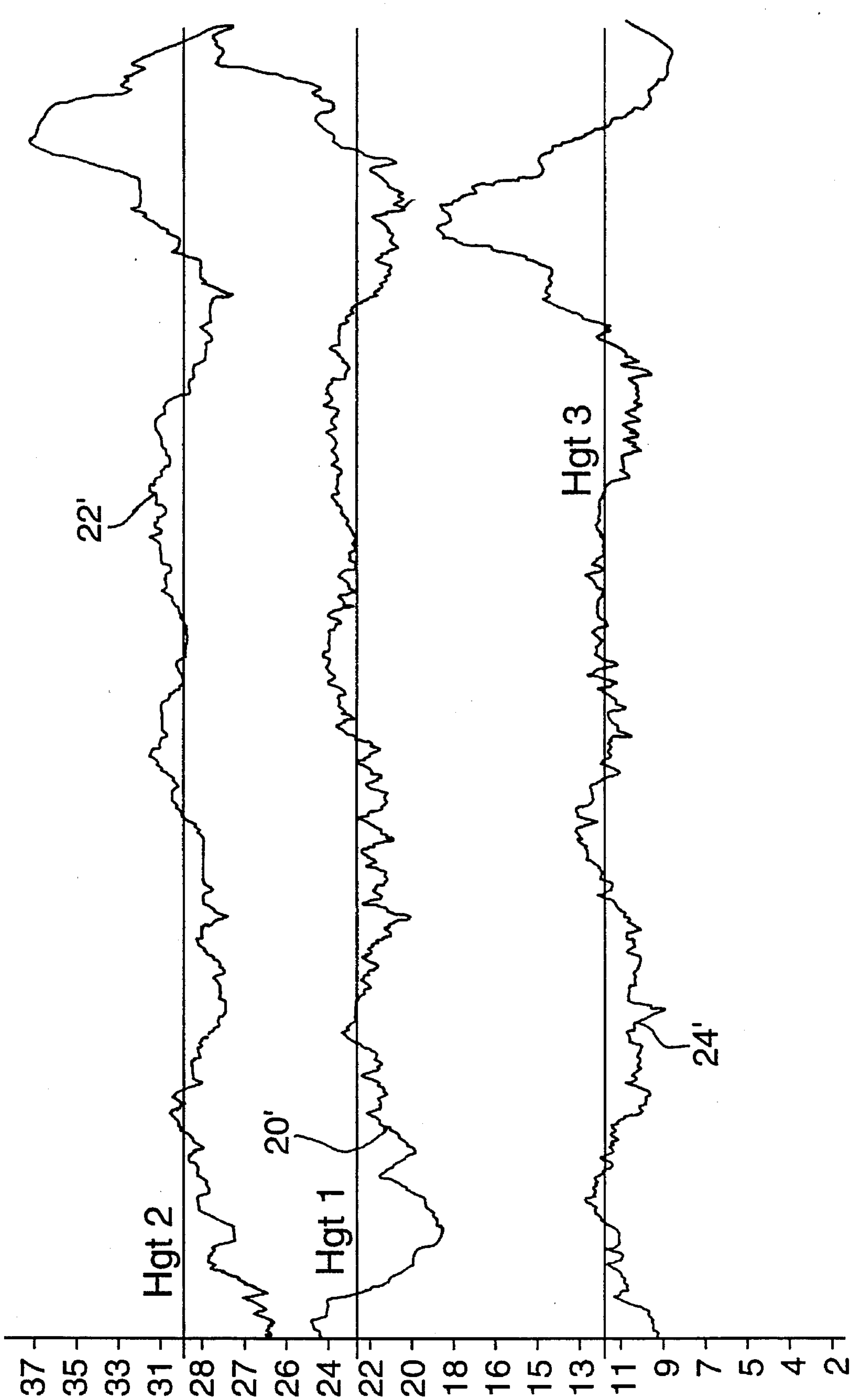
FIG. 7 is a second set of actual readings, for an adjacent second station.

In the case of FIG. 7, the mean values obtained were:

Laser 1 . . . 22.5 mm; Laser 2 . . . 30.1 mm; Laser 3 . . . 11.5 mm.

From these actual distance-to-shell observed figures an indication is given of the local variations in shell rotational centre that can arise, it being noted, however that the values have not, at this stage been correlated back to a common (zero) datum.

What is claimed:

1. Apparatus for determining the location of a rotatable body relative to an established datum, comprising survey theodolite means positioned at the established datum for reading upon a distant, portable chassis means located adjacent said rotatable body, the chassis means having at least two reflecting targets, and target adjustment means for aligning the at least two reflecting targets in substantially aligned reflecting relation with the theodolite means to enable line of sight measurement from the established datum to the portable chassis, to thereby accurately determine the location of the chassis means in three dimensions, relative to said datum, said chassis means including at least two distance measuring means for measuring selected distances between said chassis means and said rotatable body.

2. The apparatus as set forth in claim 1, said target adjustment means comprising remote control means to orientate said reflecting targets in direct reflecting relation with said theodolite means.

3. The apparatus as set forth in claim 1, including relocation target means, to facilitate relocation of said survey theodolite means relative to said established datum.

4. The apparatus as set forth in claim 1, said chassis having three said distance measuring means mounted thereon in substantially coplanar relation, for measuring said selected distances in a common plane, said rotatable body having a cylindrical body portion with an axis of rotation extending substantially normal to said common plane, from which said body portion said distances are measured.

5. The apparatus as set forth in claim 2, said remote control means comprising radio control means.

6. The apparatus as set forth in claim 5, said reflecting targets each having pivotal support means, and servo motor means in repositioning controlling relation therewith.

7. The apparatus as set forth in claim 1, said chassis means including cooling means for cooling said distance measuring means within the environment of said rotatable body.

8. The apparatus as set forth in claim 4, said distance measuring means comprising diode laser measuring means.

9. The apparatus as set forth in claim 8, including adjustable mounting means for mounting said chassis means in selected, spaced relation from said rotatable body.

10. The apparatus as set forth in claim 8, including computer means, to receive data from said distance measuring means.

11. The apparatus as set forth in claim 1, said survey theodolite means comprising an integrated total station theodolite.

12. The apparatus as set forth in claim 11, said theodolite including transferrable data recordal means, to enable transfer of measurement data generated by said theodolite to a computer.

13. The apparatus as set forth in claim 12, said computer being connected to a plurality of diode laser measuring means mounted in mutually spaced, substantially aligned relation upon said distant body.

14. A centre location apparatus, for use in determining the centre of rotation of a rotating cylinder, comprising a chassis for location in predetermined spaced relation adjacent a surface of said cylinder, having three distance measuring means mounted in mutually spaced relation on said chassis, and operable substantially simultaneously to provide read-out of respective distances therefrom to said surface, and computer means to receive said read-out therefrom.

15. The method of surveying a rotating cylindrical body from a position adjacent thereto, including locating near-distance measuring means at a first station adjacent said body, for obtaining coordinated triangulation measurements substantially simultaneously from the rotating surface of said body, operating said near-distance measuring means to provide said measurements, and calculating the centre of rotation of said body relative to said measuring means.

16. The method as set forth in claim 15, including establishing a first measurement datum remote from said measuring means, establishing remote-distance measuring means thereat, and precisely locating said near-distance measuring means relative to said datum, to enable the relating of said triangulation measurements to said datum.

17. The method as set forth in claim 16, including the step of relocating said near-distance measuring means along said body to a second station adjacent said first station, operating said remote-distance measuring means to locate said near-distance measuring means relative to said datum, and operating said near-distance measuring means to provide triangulation data for said second station.

18. The method as set forth in claim 16, including relocating said remote-distance measuring means to a further location, as a second measurement datum in line-of-sight relation with said relocated near-distance measuring means, and determining the triangulated relation between said first and said second datum, to enable the transforming of distance data related to said second datum to relate to said first datum, and transforming said triangulation data for said second station to said first datum.

19. The method as set forth in claim 18, including the steps of determining a plurality of centre distances to said cylinder centreline from a corresponding plurality of stations, and plotting said centre values to a common datum, to determine deviations of said centres from a common straight line axis.

20. The method as set forth in claim 15, said near-distance measuring means comprising three near-distance measuring devices; wherein each said near-distance measuring device is operated repeatedly during rotation of said body to provide a rotational cycle of distance measurements for each said device; including the steps of averaging said rotational cycle of measurements to provide a mean value thereof; said mean measurement values being used to calculate the centre of rotation of said body at said first station.

* * * * *